United States Patent
Hietalahti et al.

(10) Patent No.: US 9,456,403 B2
(45) Date of Patent: Sep. 27, 2016

(54) METHODS AND APPARATUS FOR MANAGING NETWORK SIGNALING

(75) Inventors: Hannu P. Hietalahti, Kiviniemi (FI); Matti K. Jokimies, Salo (FI); Guillaume Sebire, Espoo (FI)

(73) Assignee: BROADCOM CORPORATION, Irvine, CA (US)

( * ) Notice: Subject to any disclaimer, the term of this patent is extended or adjusted under 35 U.S.C. 154(b) by 905 days.

(21) Appl. No.: 13/291,339

(22) Filed: Nov. 8, 2011

(65) Prior Publication Data
US 2013/0115893 A1  May 9, 2013

(30) Foreign Application Priority Data

Nov. 4, 2011  (GB) .................................. 1119097.2

(51) Int. Cl.
  *H04B 7/00* (2006.01)
  *H04W 48/02* (2009.01)
  *H04W 74/04* (2009.01)
  *H04W 4/00* (2009.01)

(52) U.S. Cl.
  CPC ............. *H04W 48/02* (2013.01); *H04W 74/04* (2013.01); *H04W 4/005* (2013.01)

(58) Field of Classification Search
  CPC ................................. H04W 60/00; H04B 7/00
  USPC ........ 455/68, 435.1, 574, 343.5, 343.1, 522, 455/500, 78
  See application file for complete search history.

(56) References Cited

U.S. PATENT DOCUMENTS

| | | | | |
|---|---|---|---|---|
| 7,155,263 B1* | 12/2006 | Bergamo | .......... | H04W 52/0229 455/343.1 |
| 7,835,712 B1* | 11/2010 | Shi | .......... | H04W 48/16 455/161.1 |
| 8,244,244 B1* | 8/2012 | Hietalahti | .......... | H04W 60/02 370/332 |
| 2006/0140135 A1 | 6/2006 | Bonta et al. | .......... | 370/254 |
| 2009/0003252 A1* | 1/2009 | Salomone | .......... | H04W 52/0229 370/311 |
| 2011/0110308 A1* | 5/2011 | Liang | .......... | H04W 60/06 370/328 |
| 2011/0128911 A1* | 6/2011 | Shaheen | .......... | H04L 63/104 370/328 |

(Continued)

FOREIGN PATENT DOCUMENTS

| | | |
|---|---|---|
| EP | 2385714 A2 | 11/2011 |
| WO | 2011/042417 | 4/2011 |
| WO | WO-2011/062841 A1 | 5/2011 |

OTHER PUBLICATIONS

3GPP TSG WG2 Meeting # 83. Title: key issue for infrequently transmission. Feb. 25, 2011.*

(Continued)

*Primary Examiner* — Md Talukder
(74) *Attorney, Agent, or Firm* — Oblon, McClelland, Maier & Neustadt, L.L.P.

(57) ABSTRACT

Systems and apparatus for managing signaling between a network and machine type communication (MTC) devices. An MTC device receives an indication such as a locally detached state indication and, during the validity of the indication, remains locally detached and does not attempt communication with the network except under specified conditions, such as a need by the MTC device to initiate data transfer, or triggering of the MTC device. The MTC device may also receive a local detachment timer and remain attached during the validity of the local detachment timer, with the MTC device becoming locally detached and the indication becoming valid upon expiration of the local detachment timer.

17 Claims, 3 Drawing Sheets

(56) References Cited

U.S. PATENT DOCUMENTS

| | | | | |
|---|---|---|---|---|
| 2011/0140846 A1* | 6/2011 | Blanz | H04W 4/005 | 340/7.1 |
| 2011/0287765 A1* | 11/2011 | Russell | H04W 8/06 | 455/435.1 |
| 2012/0220326 A1* | 8/2012 | Li | H04W 4/005 | 455/509 |
| 2013/0083653 A1* | 4/2013 | Jain | H04W 4/005 | 370/230 |
| 2013/0084894 A1* | 4/2013 | Jain | H04W 4/005 | 455/458 |
| 2013/0115893 A1* | 5/2013 | Hietalahti | H04W 48/02 | 455/68 |
| 2013/0183969 A1* | 7/2013 | Kang | H04W 60/00 | 455/435.1 |
| 2014/0044030 A1* | 2/2014 | Ramachandran | H04W 52/0235 | 370/311 |

OTHER PUBLICATIONS

EP Search Report issued in connection with corresponding GB Patent Application No. GB1119097.2 mailed Mar. 1, 2012.

"3rd Generation Partnership Project;Technical Specification Group Services and System Aspects; System Improvements for Machine-Type Communications (Release11)"; 3GPP Standard; 3GPP TR 23.888, 3rd Generation Partnership Project (3GPP), Mobile Competence Centre; 650, Route Des Lucioles : F-06921 Sophia-Antipolis Cedex, France, vol. SA WG2, No. V1.4.0. Aug. 5, 2011, pp. 1-139,XP050553713, sections 5.2.2, 5.4.1, 5.4.2, 5.6.1,5.6.2, 5.8.1, 5.8.2, 5.11.1, 6.6.2, 6.7.2,6.20.2.

NTT Docomo et al: 'Access Class barring, enhancements to support PPAC', 3GPP Draft; R2-081737 AC Barring, 3rd Generation Partnership Project (3GPP),Mobile Competence Centre, 650, Route Des Lucioles ; F-06921 Sophia-Antipolis Cedex Lucioles ; F-06921 Sophia-Antipolis Cedex, vol. RAN WG2, no. Shenzhen, China; Mar. 25, 2008, XP050139447,sections 2.1, 2.3, 5.3.3.2, figure 2.

Nokia Si Emens Networks: "Key Issue for Infrequent Transmission",3GPP Draft; S2-110778 SIMTC__Infrequent_Transmission Key Issue,3rd Generation Partnership, Project (3GPP), Mobile Competence Centre,650, Route Des Lucioles; F-0692, Sophia-Antipolis Cedex; France,vol. SA WG2, no. Salt Lake City, 20110221,Feb. 15, 2011,XP050523943, sections 2, 5.x.2, 6.6.2, 6.20.2.

* cited by examiner

METHODS AND APPARATUS FOR MANAGING NETWORK SIGNALING

PRIORITY

This application claims priority under 35 U.S.C. 119(a) to "Methods and Apparatus for Managing Network Signaling," UK Patent Application No. 1119097.2, filed on 4 Nov. 2011 and incorporated herein by reference in its entirety.

TECHNICAL FIELD

The exemplary and non-limiting embodiments of this invention relate generally to wireless communication systems, methods, devices and computer programs, and more specifically relate to the use of machine-type communication devices which need not have a continuous connection with a host network.

BACKGROUND

The following abbreviations that may be found in the specification and/or the drawing figures are defined as follows:

| | |
|---|---|
| CBS | cell broadcast service |
| CDMA | code division multiple access |
| eNodeB | evolved Node B |
| HSS | home subscription server |
| IWF | interworking function |
| LTE | long term evolution |
| M2M | machine-to-machine |
| MTC | machine-type communication |
| PLMN | public land mobile network |
| RA | random access |
| UE | user equipment |

Machine to machine (M2M) communication is the networking of intelligent, communications-enabled remote assets. It allows important information to be exchanged automatically without human intervention, and covers a broad range of technologies and applications which connect the physical world—whether machines or monitored physical conditions—to a back-end information technology infrastructure. M2M communications can be used for a variety of purposes, such as immediate feedback or control on a remote asset, feature popularity, and specifics of errors and breakdowns, to name a few.

M2M communications are made possible by the use of elements such as intelligent sensors, actuators or microprocessors that are embedded in the remote asset. Sensors and actuators may be connected to a wireless modem, possibly different from those in conventional mobile phones. Such a wireless modem is able to wirelessly receive data from a central server, and transmit data to the central server where it can be analyzed and acted upon. Wireless communications technologies used to enable this connectivity include GSM, GPRS, CDMA, 3G, LTE, Wi-Fi and WiMAX, and M2M communications can be conducted over a relatively short range or a distance of many miles. Since M2M communications vary widely in both the types of data reported and the radio access technologies used, the traffic models are quite diverse and no single networking model is efficient for all of them. For example, if M2M is applied to monitor natural disasters, a huge number of M2M devices may initiate services simultaneously, with each reporting a small amount of data to the application layer when triggered by an appropriate event. This is classified as an infrequent small data transmission. In conventional cellular systems a mobile terminal typically goes through a control signaling procedure to establish a data connection with the network before it can send user data. This is inefficient for infrequent small data transmissions since the conventional signaling overhead in setting up a data channel for the user terminal is high relative to the small volume of user data being reported by an MTC UE. Because MTC UEs transmit relatively infrequently, the network load imposed by their normal data transmission is very low. For this reason, large numbers of MTC UEs may be present in a geographic area served by a network. The expectation is that very few of these devices will transmit at any one time, so the presence of even very large numbers of them will not overload the network.

However, data signaling is not the only source of load imposed by MTC or other devices. Control signaling also imposes a load on a network, and must be minimized in order to achieve network efficiency and avoid overload.

SUMMARY

The foregoing and other problems are overcome, and other advantages are realized, by the use of exemplary embodiments of this invention.

In a first embodiment of the invention, an apparatus, comprises at least one processor; and at least one memory storing a computer program. The at least one memory with the computer program is configured with the at least one processor to cause the apparatus to perform functions comprising at least storing an indication specifying at least one required condition under which the apparatus is allowed to perform machine type communication with a wireless network and a time period during which the indication is valid and, while the indication is valid, refraining from attempting communication with the wireless network unless at least one of the required conditions prevails.

In another embodiment of the invention, an apparatus comprises at least one processor and at least one memory storing a computer program. The at least one memory with the computer program is configured, with the at least one processor, to cause the apparatus to perform functions comprising at least sending to a machine type communication device an indication specifying at least one required condition under which the device is allowed to perform machine type communication with a wireless network and a time period during which the indication is valid.

In another embodiment of the invention, a method comprises configuring at least one processor to cause an apparatus to perform functions comprising storing an indication specifying at least one required condition under which the apparatus is allowed to perform machine type communication with a wireless network and a time period during which the indication is valid and, while the indication is valid, refraining from attempting communication with the wireless network unless at least one of the required conditions prevails.

In another embodiment of the invention, a computer readable medium stores a program of instructions. Execution of the program of instructions by a processor configures an apparatus to perform functions comprising storing an indication specifying at least one required condition under which the apparatus is allowed to perform machine type communication with a wireless network and a time period during which the indication is valid and, while the indication is valid, refraining from attempting communication with the wireless network unless at least one of the required conditions prevails.

DETAILED DESCRIPTION

Figure 1:
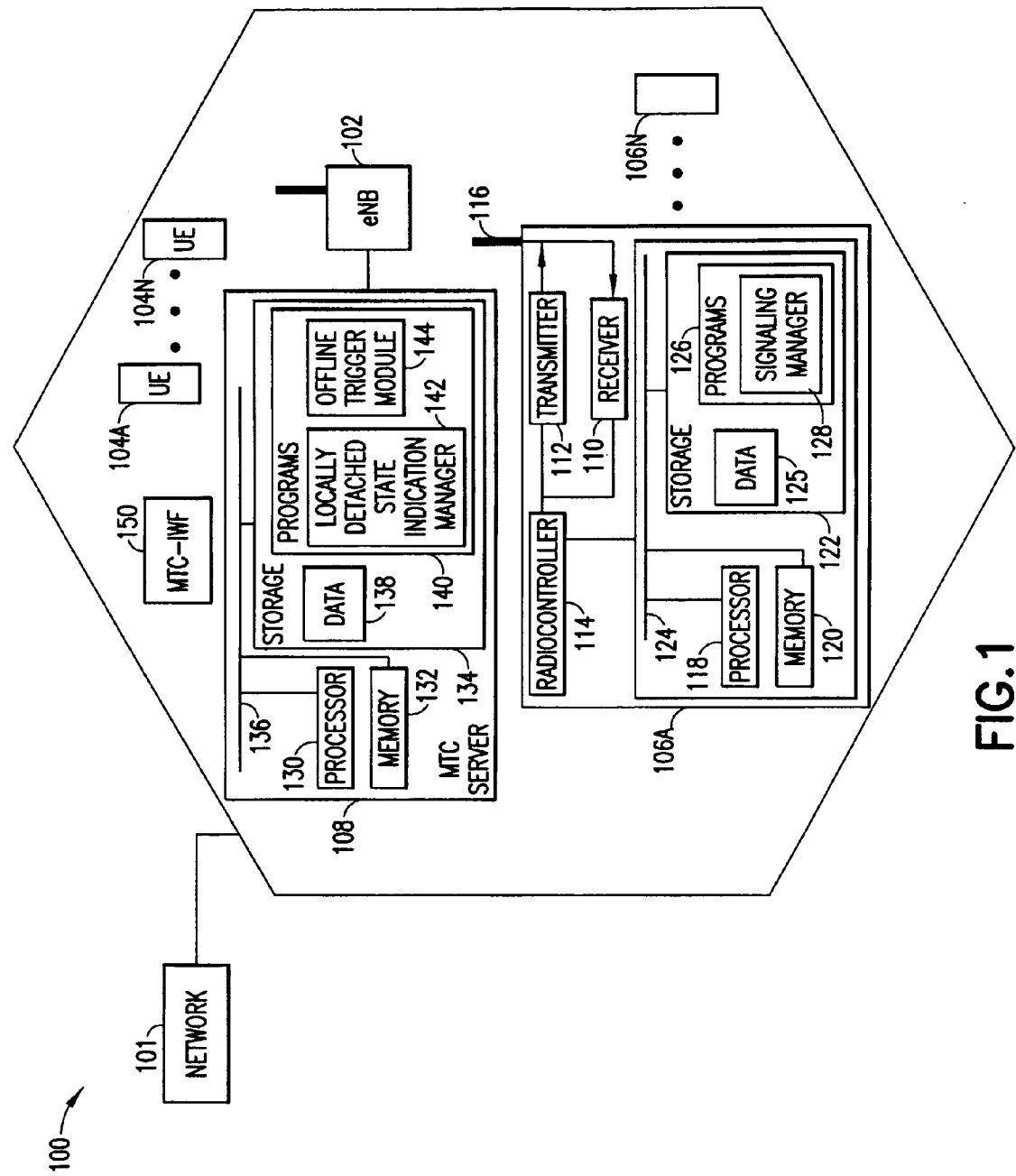
FIG. 1 illustrates a wireless network cell serving one or more machine-type communication (MTC) devices.

The present invention recognizes that the nature of machine to machine communication by machine-type communication devices often involves infrequent transmission of small amounts of data at unexpected times, by devices that may spend extended periods disconnected from a central communication device. The invention also recognizes that very large numbers of such devices may enter into operation at approximately the same time upon the occurrence of a triggering event. The invention further recognizes that numerous different types of MTC UEs may exist and may begin communication at the same time. The invention still further recognizes that a central communication device to which MTC UEs deliver data may be expected to also serve numerous other devices. For example, MTC UEs may be designed so as to operate within a wireless network. A wireless network comprises a plurality of base stations, with each base station typically serving numerous user equipments (UEs), providing voice and data communication on a constant basis.

The invention recognizes that these and other considerations indicate that efficiency in signaling is an important factor. If a UE is capable of services that require registration, at switch-on the basic behavior is to perform a PLMN selection, camp on a suitable cell of the selected PLMN, and attempt registration to that PLMN. That is, registration to a network will be accomplished by a UE that is switched on, has selected a PLMN, and is camping on a suitable cell of that PLMN. Registration may be rejected for any number of reasons, and rejection can trigger a UE to enter a limited service state or to attempt selecting another PLMN. Normally, UEs register when switched on, and maintain their registration by performing periodic Location Registration. In addition, location registration is performed when a location area is changed. MTC UEs are typically stationary and would rarely perform location registration due to a change of location area. In cases in which an MTC UE is present in a boundary area of a cell, unnecessary reselection and location area updates may be prevented by appropriate rejection messages.

Embodiments of the present invention recognize that a network might not have sufficient capacity to keep registration information stored for each MTC UE as well as the non-MTC UEs that need to be served. MTC applications are likely to require data transfer to or from a device only rarely. For this reason, keeping such a UE registered to a network, during all the time that it is switched on, contributes to network congestion and overloading while serving no useful purpose. The load is particularly significant in situations in which the network element maintaining the registration, such as an MME, needs to be changed.

Embodiments of the invention further recognize that registration involves considerable location registration, attachment, and detachment signaling due to periodic updates associated with a continuous registration status. Embodiments of the invention further recognize that state transitions of MTC UEs need to be controlled flexibly because different MTC applications may have very different timing requirements. If such differences are accommodated by switching the location period on and off separately for MTC UEs, a signaling burden arises from the need for explicit signaling every time there is a change of the state, or a need for a new timer value.

FIG. 1 illustrates a cell 100 representing a portion of a geographic area served by a cellular communications network 101. The cell 100 is served by a base station, which in the present exemplary embodiment is an eNodeB 102. Various devices served by the eNodeB 102 operate within the cell 100, including various UEs 104A, . . . , 104N, which are not further addressed here but which represent devices making demands on the resources provided by the eNodeB 102. The devices served by the eNodeB 102 also include a number of machine type communication (MTC) UEs 106A, . . . , 106N. The MTC UEs 106A, . . . , 106N may be of various types requiring different communication mechanisms.

The network 101, in order to manage the MTC UEs in the cell 100 and in other cells, may also employ an MTC server 108 that manages data communication to and from the MTC UEs 106A, . . . , 106N and control signaling and instructions. In order to reduce problems such as those described above and decrease the need for control signaling connected with registration, embodiments of the present invention provide an indication to an MTC UE defining when it is permitted to attempt location registration or attachment to a network. The indication may be referred to as a locally detached state indication, and directs the MTC UEs 106A, . . . , 106N to attempt location registration or attachment to the network only under the following conditions:

1. Upon reception of a specific trigger from the MTC server;
2. When the MTC UE has data that it needs to transmit;
3. When the indication is no longer valid.

The MTC UE 106A may suitably include a receiver 110, transmitter 112, radiocontroller 114, and antenna 116. The MTC UE 106A may also include a processor 118, memory 120, and storage 122, communicating with one another and with the radiocontroller 114 over a bus 124. The MTC UE 106A may also store data 125 and programs 126, residing in storage 122. The programs 126 may include a signaling manager 128. The remaining MTCs device 106B, . . . , 106N may include similar elements to those of the MTC UE 106A.

The signaling manager 128 manages attachment of the MTC UE 106A to and detachment from the network 100, performing attachment and detachment signaling as needed. For example, the MTC UE 106A may attach to the network 100, when such attachment is needed, such as when the device 106A has data to transmit. The MTC UE 106A may detach from the network when the condition requiring attachment ends. While the device 106A is attached, appropriate network elements, such as the MTC server 108, maintain necessary registration and other information. Attachment and detachment involve appropriate signaling by the device 106A and network elements such as the eNodeB 102.

When a device is attached, maintaining its attachment requires resources such as information storage and signaling such as location update signaling. When a device is in a detached state, as seen by the network, without being aware that it is in such a detached state, it is likely to attempt communication while considered detached by the network. Its communication attempt will be rejected, and it will then perform attachment signaling and perform the communication that was previously attempted. Such a failed attempt at communication, carrying with it the need for rejection signaling from the network 101 and from the need on the part of the MTC UE 106A, adds to the load on the network to no purpose. When multiplied by very large numbers of MTC UEs, such wasted signaling has the potential to overwhelm the network 100.

In order reduce the time that an MTC UE such as the MTC UE 106A needs to be attached, as well as the signaling needed for attachment and detachment, the MTC UE 106A receives the locally detached state indication, which may suitably come in the form of a message or other information element generated by the MTC server 108 and transmitted to the MTC UE 106A, suitably through ordinary wireless communication using the eNodeB 102. Once received by the MTC 106A, the locally detached state indication may suitably be stored as an element of the data 125. The locally detached state indication includes a designation of a duration during which it is valid, and, as noted above, suppresses attachment and location registration attempts by the MTC UE 106A during this duration. When the locally detached state indication is valid, the MTC UE 106A is aware that it cannot rely on being attached to the network 100 in a conventional way.

The MTC server 108 may suitably comprise a processor 130, memory 132, and storage 134, communicating with one another over a bus 136. The MTC server 108 may include a connection or other mechanism for communicating through the eNodeB 102, and delivers information to and receives information from the MTC UEs 106A, . . . , 106N through the eNodeB 102. The MTC server 108 suitably stores data 138 and a set of programs 140.

The programs 134 of the server 108 may suitably include a locally detached state indication manager 142. The locally detached state indication manager 142 designs a locally detached state indication with an appropriate duration for the MTC UE MTC 106A, or other MTC UE to which a locally detached state indication should be furnished.

When the MTC UE 106A receives the locally detached state indication, it uses the locally detached state indication to inform the operation of the signaling manager 128, which directs the performance of needed attachment, detachment, and communications. The signaling manager 128 monitors whether a valid indication detached state indication is present and controls signaling by the MTC UE 106A accordingly. If a valid indication is present, the signaling manager 128 allows signaling only when a specific trigger is received or when the MTC UE 106A has data to transmit. The server 108 may implement an offline trigger module 144, storing information indicating to the state of MTC UEs such as the device 106A. The MTC server 108, or an MTC interworking function (MTC-IWF) 150 or similar device, may store registration information for an MTC UE such as the MTC UE 106A and other devices, but such storage does not have the same impact on such network operations as MME load sharing. In addition, timing and reliability requirements for elements such as an MTC-IWF and an MTC server are not as strict as are typical 3GPP network requirements, so that storage of registration information can be accomplished at lower cost than in the case of elements more directly involved in communication with UEs other than or in addition to MTC UEs.

By storing registration information, the MTC server 108, MTC-IWF, or other device, is able to initiate contact with an MTC UE such as the MTC UE 106A even when the device 106A is seen by the network as detached from the network. It is therefore possible to trigger the MTC UE 106A during times when the locally detached state indication is active and the MTC UE 106A will not automatically attempt communication or attachment. The signaling manager 138 may control the MTC UE 106A so as to periodically listen to specific information such as broadcast information for a possible trigger. CBS messages comprise one example of such broadcast information.

When the network 101 needs to communicate with the MTC UE 106A while the device 106A is in a locally detached state, the MTC server 108 may receive an appropriate message and send a trigger to the MTC UE 106A, suitably when registration information stored by the server 108 indicates that the MTC UE 106A is listening for a trigger. The signaling manager 128 may respond to a trigger by initiating an attach procedure.

As noted above, if the MTC UE 106A has data that it needs to transmit, it may perform an attachment during the validity of the locally detached state indication. The presence of a valid locally detached state indication informs the signaling manager 128 that the MTC UE 106A is locally detached and that an attachment needs to be performed before communication can be accomplished. Therefore, the signaling manager 128 directs the MTC UE 106A to first perform attachment signaling, and only after attachment has been accomplished, to communicate the data.

When an attachment has been accomplished and data communication accomplished, whether attachment is initiated by the MTC UE 106A or through a trigger from the network 101, appropriate values and timers are sent to the MTC UE 106A by the network 101. The values may include a validity value, such as "on," for a locally detached state indication and a timer indicating a validity period, such as one week. In addition, the values may include a local detachment timer. The local detachment timer takes into account that the probability for a new data transfer session is higher just after the previous session, so that it may be advantageous to maintain the MTC 106A in an attached state for a specified period. In that way, a subsequent data transfer occurring before the local detachment timer expires can be conducted without a need to perform a new attachment. Once the local detachment timer expires, the MTC UE 106A may locally detach from the network without signaling, and may remain locally detached until the detached state indication expires, unless the MTC 106A needs to transmit data or the network 101 triggers attachment. Once the locally detached state indication expires, the signaling manager 138 may direct attachment.

Figure 2:
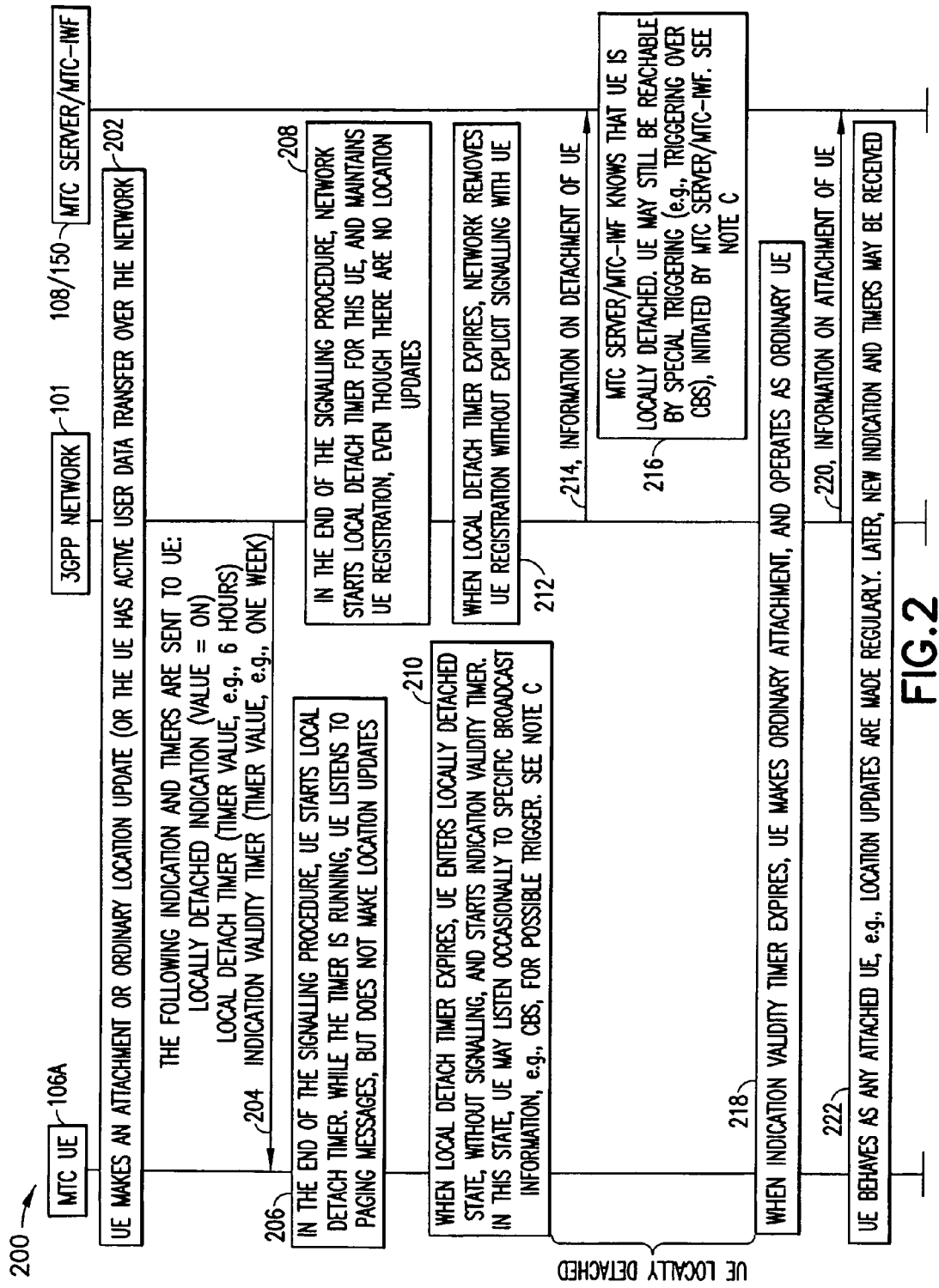
FIG. 2 is a diagram illustrating communication and events relating to an M2M UE entering a locally detached state and upon the expiration of a timer, returning to normal service mode on its own initiative.

FIG. 2 illustrates a diagram 200 showing information flow in an embodiment of the present invention, with operations being performed by, and information flowing between, an MTC UE such as the MTC UE 106A, and a 3GPP network such as the network 101 with the MTC server 108 and MTC-IWF 150 broken out of the network 101 so as to explicitly show the signaling in which one or both of them is involved. The designation "3GPP network" used to describe the network 101 includes generally recognized network elements, of which signaling elements such as MME and SGSN are particularly noteworthy. The elements 106A, 101, and one or both of the elements 108 and 150 are illustrated here as engaging in various actions and exchanging various signals or information elements.

A suitable event for initiating discussion of the various operations is a session activation 202 by the UE 106A. Such activation may occur, for example, as an attachment or ordinary location update, or may occur when the UE has user data to deliver to the network 101. Communication is conducted between the UE 106A and the network 101. Signaling 204 is used to deliver appropriate values and timers from the network 101 to the UE 106A. Such timers may include a locally detached state indication value, a local detach timer value, and a locally detached state indication validity timer value. In the operation 206, the UE starts the local detach timer. While the local detach timer is running, the UE listens to paging messages, but does not perform location updates. In the operation 208, the network 101 starts the local detach timer for the UE, and maintains UE registration, although there are no location updates. When the local detach timer expires, the operation 210 is carried out by the UE 106A. The UE 106A enters a locally detached state, without signaling, and starts an indication validity timer. In this state, the UE 106A may listen occasionally to specific information such as broadcast information, of which one example comprises CBS messages, for possible triggers. The network 101 performs the operation 212, removing UE registration information without a need for explicit signaling between the network 101 and the UE. The network 101 sends signaling 214 to the MTC server 108, the MTC-IWF, or both. Thus, the MTC server 108 or MTC-IWF 150 is aware that the UE 106A is locally detached, but at operation 216 may perform special triggering such as over a CBS. When the locally detached state indication validity timer expires, at operation 218 the UE 106A makes an ordinary attachment to the network 101 and operates as an ordinary UE. Information on the attachment of the UE 106A is sent as signaling 220 to the MTC server 108 or MTC-IWF 220.

The operation 222 is then performed, with information being exchanged between the MTC 106A and the network 101. The UE 106A behaves as any attached UE, with regular location updates being made.

Figure 3:
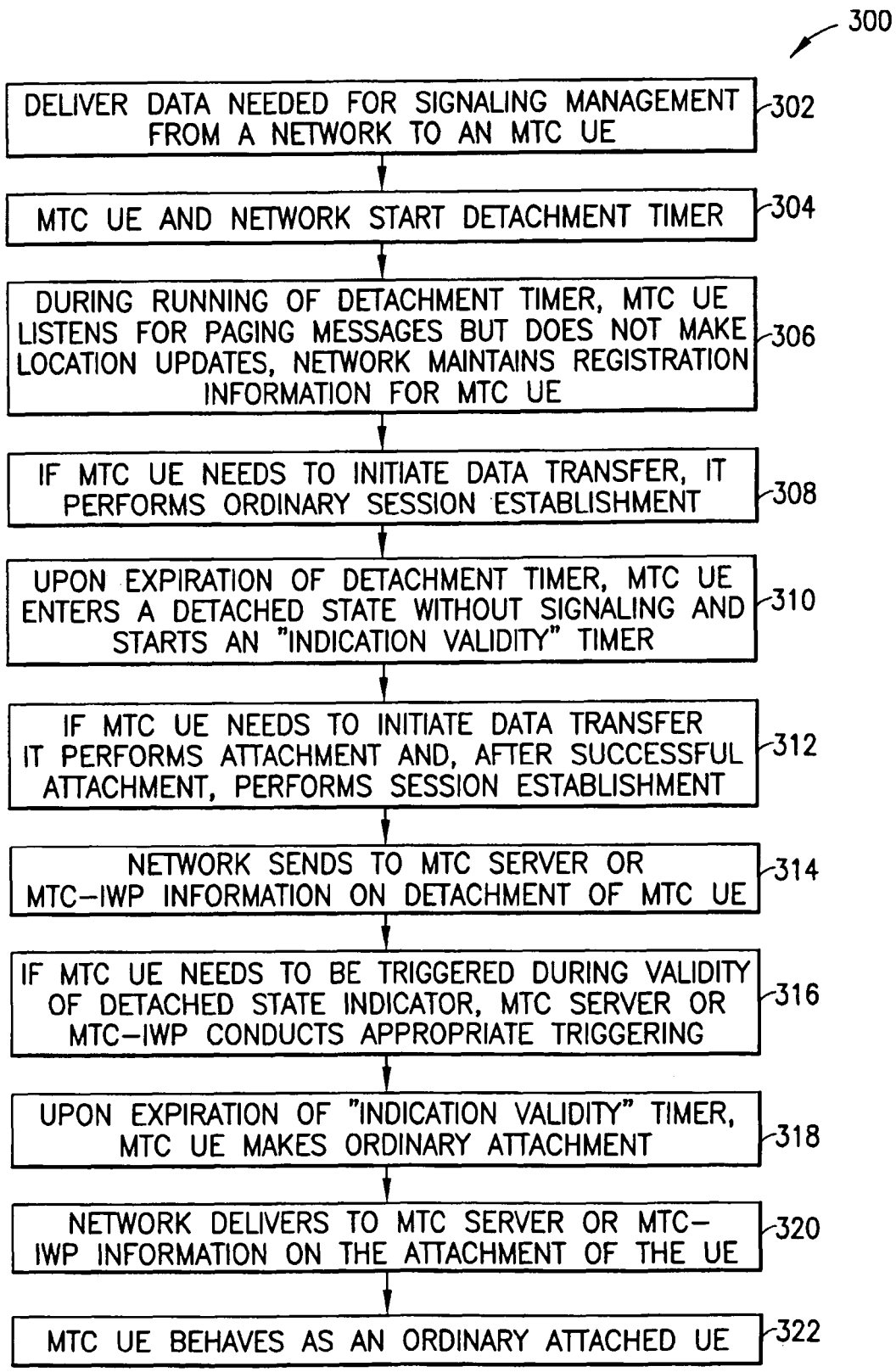
FIG. 3 illustrates a process according to an embodiment of the present invention.

FIG. 3 illustrates a process 300 according to an aspect of the present invention. At step 302, suitably at the termination of a communication session between an MTC UE and a network, data needed for signaling management is delivered to the MTC UE, such as a validity state of a locally detached state indication, a timer value for the indication, and a local detachment timer. At step 304, the MTC UE and the network start the local detachment timer. At step 306, during the running of the local detachment timer, the MTC UE listens for paging messages, but does not make location updates, and the network maintains registration information for the MTC UE. At step 308, if the MTC UE needs to initiate data transfer, it performs ordinary session establishment. No attachment signaling is needed because the MTC UE has not detached from the network.

At step 310, upon the expiration of the local detachment timer, the MTC UE enters a locally detached state without signaling, and starts an "indication validity" timer. At step 312, if the MTC UE needs to initiate data transfer, it performs attachment and, after successful attachment, performs ordinary session establishment.

At step 314, the network sends to an MTC server or MTC-IWF information on the local detachment of the MTC UE. At step 316, if the MTC UE needs to be triggered during the validity of the locally detached state indication, the MTC server or MTC-IWF conducts appropriate triggering, for example, over CBS. At step 318, upon expiration of the "indication validity" timer, the MTC UE makes an ordinary attachment. At step 320, the network delivers to the MTC server or MTC-IWF information on the attachment of the UE. At step 322, the MTC UE behaves as an ordinary attached UE, for example, making regular location updates.

While various exemplary embodiments have been described above it should be appreciated that the practice of the invention is not limited to the exemplary embodiments shown and discussed here. Various modifications and adaptations to the foregoing exemplary embodiments of this invention may become apparent to those skilled in the relevant arts in view of the foregoing description. In particular, it should be emphasized that although various exemplary embodiments have been discussed in terms of MTC type communications in an LTE system, the practice of the invention is not limited to use with MTC type communications or an LTE system, but may instead be used with any devices or communication system that might benefit from the use of embodiments of the invention.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

What is claimed is:

1. An apparatus, comprising:
   circuitry configured to:
      receive from a wireless network and store a locally detached state indication specifying at least one required condition under which the apparatus is allowed to perform communication with the wireless network and to attempt location registration with the wireless network, and a time period during which the locally detached state indication is valid; and
      while the locally detached state indication is valid, remain attached to the wireless network but refrain from attempting communication with the wireless network and from attempting location registration unless the at least one required conditions prevails, wherein when the local detached state indication expires, the wireless network removes registration information of the apparatus;
   wherein the at least one required condition comprises presence of data to be sent to the wireless network,
   and when there is data to be sent to the wireless network, the apparatus is further caused to, while the locally detached state indication is valid, perform an attachment and, after successful attachment, perform session establishment to send the data.

2. The apparatus of claim 1, wherein the locally detached state indication is received while the apparatus is attached to the wireless network.

3. The apparatus of claim 1, wherein the apparatus is further caused to initiate a local detachment timer, locally detach from the wireless network without signaling, and set the locally detached state indication to a valid state until expiration of the local detachment timer.

4. The apparatus of claim 3, wherein the apparatus is caused to remain attached to the wireless network but refrain from location registration related signaling between initiation and expiration of the local detachment timer, and when the local detachment timer expires the wireless network removes registration information of the apparatus.

5. The apparatus of claim 1, wherein the at least one required condition is receiving a triggering signal and wherein the apparatus is further caused to, upon receiving the triggering signal, perform attachment and session establishment.

6. An apparatus, comprising:
circuitry configured to:
send to a wireless communications device a locally detached state indication specifying at least one required condition under which the wireless communication device is allowed to perform communication with a wireless network and to attempt location registration with the wireless network, and a time period during which the indication is valid,
wherein while the locally detached state indication is valid, the wireless communications device remains attached to the wireless network but refrains from attempting communication with the wireless network and from attempting location registration, and when the local detached state indication expires, the apparatus removes registration information of the wireless communication device, and
the at least one required condition comprises
presence of data at the wireless communications device for transfer to the wireless network,
and when there is data at the wireless communication device to be sent to the wireless network, the wireless communication device, while the locally detached state indication is valid, performs an attachment and, after successful attachment, performs session establishment to send the data.

7. The apparatus of claim 6, wherein the apparatus is further caused to remove registration information for the wireless communications device from storage in the wireless network when the locally detached state indication becomes valid.

8. The apparatus of claim 6, wherein the apparatus is further caused to notify a machine type communication server when the indication becomes valid.

9. The apparatus of claim 6, wherein the apparatus is further caused to send an initial value of a local detachment timer value to the wireless communications device and initiate a local detachment timer, and wherein the locally detached state indication becomes valid after expiration of the local detachment timer.

10. The apparatus of claim 9, wherein the apparatus is caused to remove registration information for the wireless communications device from network storage upon expiration of the local detachment timer.

11. A method comprising:
receiving from a wireless network and storing a locally detached state indication specifying at least one required condition under which a wireless communications device is allowed to perform machine type communication with the wireless network and to attempt location registration with the wireless network, and a time period during which the indication is valid; and
while the indication is valid, remaining attached to the wireless network but refraining from attempting communication with the wireless network and from attempting location registration unless at least one of the required conditions prevails, wherein when the locally detached state indication expires, the wireless network removes registration information of the wireless communication device,
wherein the at least one required condition comprises presence of data to be sent to the wireless network,
and when there is data to be sent to the wireless network, the wireless communication device, while the locally detached state indication is valid, performs an attachment and, after successful attachment, performs session establishment to send the data.

12. The method of claim 11, further comprising initiating a local detachment timer, locally detaching from the wireless network, and setting the locally detached state indication to a valid state upon expiration of the locally detachment timer.

13. The method of claim 12, further comprising remaining attached to the wireless network but refraining from signaling location updates between initiation and expiration of the local detachment timer, and when the local detachment timer expires the wireless network removes registration information of the apparatus.

14. A non-transitory computer readable medium storing a program, wherein the program comprises computer executable instructions for causing an apparatus to at least:
receive from a wireless network and store a locally detached state indication specifying at least one required condition under which the apparatus is allowed to perform machine type communication with the wireless network and to attempt location registration with the wireless network, and a time period during which the locally detached state indication is valid; and
while the locally detached state indication is valid, remain attached to the wireless network but refrain from attempting communication and from attempting location registration with the wireless network unless at least one of the required conditions prevails, wherein when the local detached state indication expires, the wireless network removes registration information of the wireless communication device,
wherein the at least one required condition comprises presence of data to be sent to the wireless network,
and when there is data to be sent to the wireless network, the apparatus, while the locally detached state indication is valid, performs an attachment and, after successful attachment, performs session establishment to send the data.

15. The non-transitory computer readable medium of claim 14, wherein the apparatus is further caused to initiate a timer, locally detach from the wireless network, and setting the locally detached state indication to a valid state upon expiration of the local detachment timer.

16. The non-transitory computer readable medium of claim 15, wherein the apparatus is caused to remain attached to the wireless network but refrain from signaling location updates between initiation and expiration of the local detachment timer, and when the local detachment timer expires the wireless network removes registration information of the apparatus.

17. The non-transitory computer readable medium of claim 14, wherein the at least one required condition is receiving a triggering signal and wherein the apparatus is further caused to, upon receiving the triggering signal, perform attachment and session establishment.

* * * * *